(12) United States Patent
Vialèn et al.

(10) Patent No.: US 7,403,621 B2
(45) Date of Patent: Jul. 22, 2008

(54) SYSTEM FOR ENSURING ENCRYPTED COMMUNICATION AFTER HANDOVER

(75) Inventors: Jukka Vialèn, Espoo (FI); Valtteri Niemi, Helsinki (FI)

(73) Assignee: Nokia Corporation, Espoo (FI)

( * ) Notice: Subject to any disclaimer, the term of this patent is extended or adjusted under 35 U.S.C. 154(b) by 1306 days.

(21) Appl. No.: 10/013,257

(22) Filed: Nov. 6, 2001

(65) Prior Publication Data

US 2002/0066011 A1 May 30, 2002

(30) Foreign Application Priority Data

| Nov. 28, 2000 | (FI) | ................................. | 20002613 |
| Feb. 14, 2001 | (FI) | ................................. | 20010282 |

(51) Int. Cl.
*H04L 9/00* (2006.01)
(52) U.S. Cl. ...................................................... 380/272
(58) Field of Classification Search ................ 380/270, 380/272, 37, 42, 283, 29, 28, 47, 46, 44
See application file for complete search history.

(56) References Cited

U.S. PATENT DOCUMENTS

| 5,926,549 | A | | 7/1999 | Pinkas | |
| 6,119,228 | A | | 9/2000 | Angelo et al. | |
| 6,374,112 | B1 | * | 4/2002 | Widegren et al. | ......... 455/452.2 |
| 6,466,556 | B1 | * | 10/2002 | Boudreaux | ................... 370/331 |
| 6,587,680 | B1 | * | 7/2003 | Ala-Laurila et al. | .......... 455/411 |
| 6,763,112 | B1 | * | 7/2004 | Haumont | .................... 380/247 |
| 6,785,352 | B1 | * | 8/2004 | Ranta | .......................... 375/354 |
| 6,876,747 | B1 | * | 4/2005 | Faccin et al. | ................. 380/247 |
| 7,113,600 | B1 | * | 9/2006 | Rosenhed | .................... 380/272 |
| 2002/0035682 | A1 | * | 3/2002 | Niemi et al. | ................. 713/151 |
| 2002/0044552 | A1 | * | 4/2002 | Vialen et al. | ................. 370/389 |
| 2002/0071480 | A1 | * | 6/2002 | Marjelund et al. | .......... 375/141 |
| 2002/0174332 | A1 | * | 11/2002 | Vialen et al. | ................. 713/152 |
| 2003/0144003 | A1 | * | 7/2003 | Ranta et al. | ................. 455/450 |

FOREIGN PATENT DOCUMENTS

| EP | 1111952 | 6/2001 |
| JP | 55-34532 A | 3/1980 |
| JP | 11-175202 A | 7/1999 |
| JP | 2000-184452 | 6/2000 |
| WO | WO 98/37721 | 8/1998 |
| WO | WO 99/26420 | 5/1999 |

(Continued)

OTHER PUBLICATIONS

International Search Report for PCT/FI01/00870.

(Continued)

*Primary Examiner*—Matthew B Smithers
(74) *Attorney, Agent, or Firm*—Squire, Sanders & Dempsey, L.L.P.

(57) ABSTRACT

During connection setup with a first radio access network, a multimode mobile station sends an unprotected initial signaling message that includes information about those encryption algorithms that the multimode mobile station supports when it communicates in a second radio access network. The first radio access network saves some or all the information. Then it composes and sends an integrity-protected message that includes information about the encryption algorithms supported by the multimode mobile station in the second radio access network.

47 Claims, 10 Drawing Sheets

FOREIGN PATENT DOCUMENTS

| | | |
|---|---|---|
| WO | WO 00/36860 | 6/2000 |
| WO | WO 00/69206 | 11/2000 |

OTHER PUBLICATIONS

3 GPP TS 35.201, V4.0.0(Aug. 2001), 3$^{RD}$ Generation Partnership Project; Technical Specification Group Services and System Aspects; 3G Security; Specification of the 3GPP Confidentiality and Integrity Algorithms; Document 1;f8 and f9 Specification (Release 4), 2001, Valbonne, France.

3G TS 33.102, v 3.2.0(Oct. 1999), 3$^{rd}$ Generation Partnership Project; Technical Specification Group Services and System Aspects; 3G Security; Security Architecture (3G TS 33.102 version 3.2.0); 1999, Valbonne, France.

3G TS 33.102, (v3.3.1) "3$^{rd}$ Generation Partnership Project; Technical Specification Group Services and System Aspects; 3G Security; Security Architecture", version 3.3.1 Release 1999, Jan. 2000, Valbonne, France.

* cited by examiner

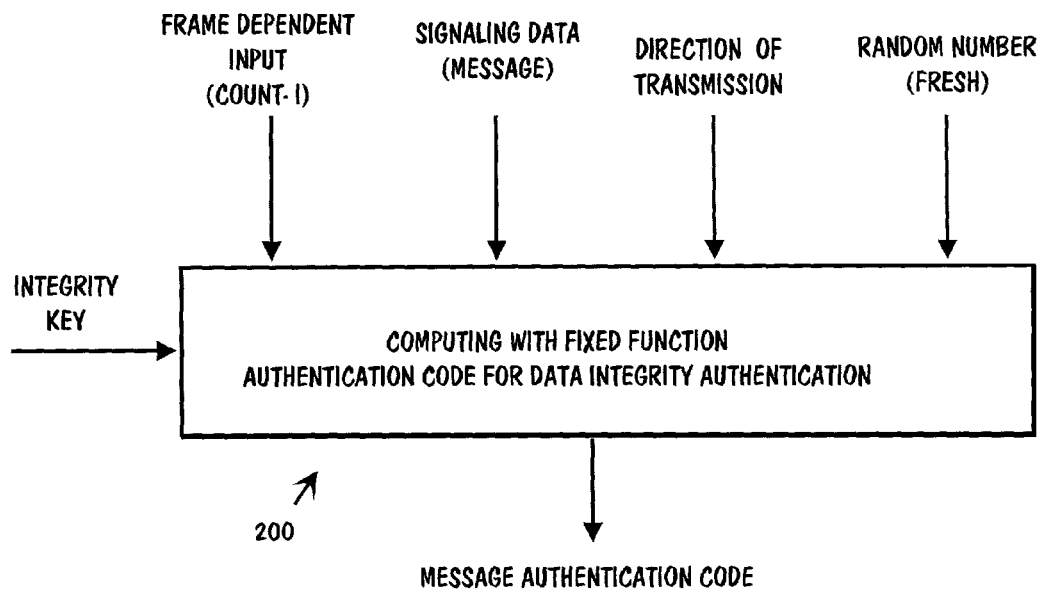
Fig. 2  *PRIOR ART*
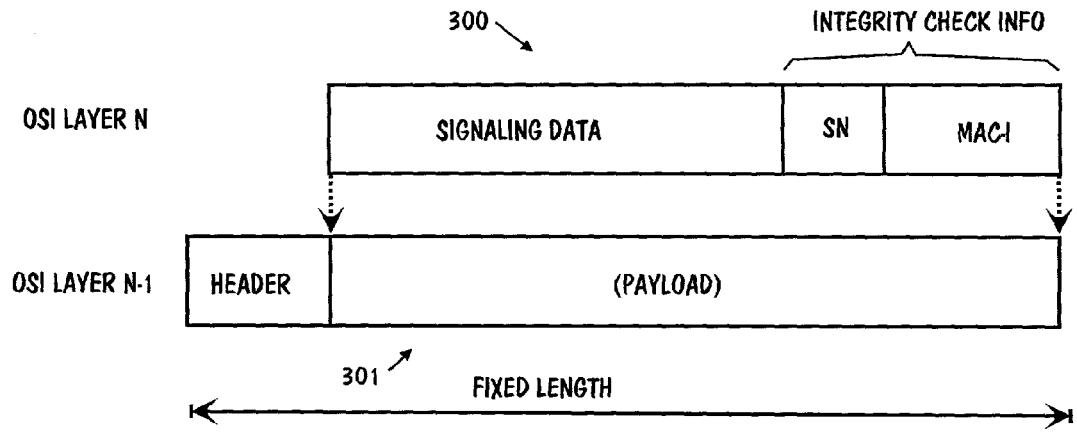
Fig. 3  *PRIOR ART*

SOLUTION 2

SYSTEM FOR ENSURING ENCRYPTED COMMUNICATION AFTER HANDOVER

FIELD OF THE INVENTION

The present invention relates generally to an integrity protection in a telecommunications network.

BACKGROUND OF THE INVENTION

A third generation mobile communications system is in Europe named UMTS (Universal Mobile Telecommunications System). It is a part of the International Telecommunications Union's IMT-2000 system. UMTS/IMT-2000 is global wireless multimedia system which provides higher transmission speed (2 Mbit/s) than the existing mobile networks.

FIG. 1 shows with a simplified block diagram a GSM (Global System for Mobile communications) network and a UMTS network. The main parts of the network are user terminals 100 and a network part that comprises the GSM base station subsystem BSS 105 and the UMTS terrestrial radio access network UTRAN 101 (which is a wideband multiple access radio network currently being specified in the 3GPP (Third Generation Partnership Project)) and a core network CN 104. The radio interface between a user terminal and the UTRAN is called Uu and the interface between the UTRAN and the 3G core network is called Iu. The interface between the GSM base station subsystem BSS and general packet radio service GPRS core network is called Gb and interface between the GSM base station subsystem BSS and GSM core networks is called A. The user terminals can be multi-mode terminals, which can operate using at least two radio access technologies, in this example UMTS and GSM. The UTRAN consists of a radio network subsystems RNS 102 that further consists of radio network controller RNC 103 and one or more nodes B (not shown in FIG. 1). An interface between two RNS is called Iur. The interface between the user terminal and the GSM base station subsystem BSS is simply called "Radio Interface". The GSM base station subsystem BSS consists of the base station controllers BSC 106 and the base transceiver stations BTS 107. The core network nodes, e.g. the (GSM) Mobile Switching Center MSC and the (GPRS) serving GPRS support node SGSN, can be capable of controlling both types of radio access networks—UTRAN and BSS. Another possible network configuration is such that each radio access network (UTRAN and BSS) has its own controlling core network node, MSC and SGSN, respectively—2G MSC, 2G SGSN and 3G MSC, 3G SGSN—but all these core network elements are connected to one and the same home location register HLR (not shown in FIG. 1), which contains all static user information, e.g. the billing of users can be controlled from one location even when the user terminals are able to operate via several different radio access networks.

The radio interface protocols which are needed to set up, reconfigure and release the radio bearer services are discussed shortly in the following. The radio interface protocol architecture in the access stratum consists of three different protocol layers which are from top to bottom: the radio network layer (L3), the data link layer (L2), and the physical layer (L1). The protocol entities in these layers are the following. The radio network layer consists of only one protocol, which in the UMTS radio interface is called RRC (Radio Recourse Control) and in the 2G GSM radio interface is called RR (Radio Resource protocol). The data link layer consists of several protocols in the UMTS radio interface called PDCP (Packet Data Convergence Protocol), BMC (Broadcast Multicast Control protocol), RLC (Radio Link Control protocol), and MAC (Medium Access Control protocol). In the GSM/GPRS radio interface, the layer 2 protocols are LLC (Logical Link Control), LAPDm (Link Access Protocol on the Dm channel), RLC (Radio Link Control), and MAC (Medium Access Control protocol). The physical layer is only one 'protocol', which has no specific name. All the mentioned radio interface protocols are specific for each radio access technique, which means that they are different for the GSM radio interface and the UMTS Uu interface, for example.

In the UMTS, the RRC layer offers services to higher layers i.e. to a non access stratum NAS via service access points which are used by the higher protocols in the user terminal side and by the Iu RANAP (Radio Access Network Application Part) protocol in the UTRAN side. All higher layer signaling (mobility management, call control, session management, etc.) is encapsulated into RRC messages for transmission over the radio interface.

All telecommunication is subject to the problem of how to make sure that the information received has been sent by an authorized sender and not by somebody who is trying to masquerade as the sender. The problem is particularly evident in cellular telecommunication systems, where the air interface presents an excellent platform for eavesdropping and replacing the contents of a transmission by using higher transmission levels, even from a distance. A basic solution to this problem is the authentication of the communicating parties. An authentication process aims to discover and check the identity of both the communicating parties, so that each party receives information about the identity of the other party and can rely on the identification to a sufficient degree. Authentication is typically performed in a specific procedure at the beginning of the connection. However, this does not adequately protect subsequent messages from unauthorized manipulation, insertion, and deletion. Thus, there is a need for the separate authentication of each transmitted message. The latter task can be carried out by appending a message authentication code (MAC-I) to the message at the transmitting end and checking the MAC-I value at the receiving end.

A MAC-I is typically a relatively short string of bits based in some specified way on the message it protects and on a secret key known both by the sender and by the recipient of the message. The secret key is generated and agreed on typically in connection with the authentication procedure at the beginning of the connection. In some cases the algorithm that is used to calculate the MAC-I based on the secret key and on the message is also secret, but this is not usually the case.

The process of authentication of single messages is often called integrity protection. To protect the integrity of signaling, the transmitting party computes a MAC-I value based on the message to be sent and the secret key using the specified algorithm, and sends the message with the MAC-I value. The receiving party recomputes a MAC-I value based on the message and the secret key according to the specified algorithm, and compares the received MAC-I and the calculated MAC-I. If the two MAC-I values match, the recipient can trust that the message is intact and has been sent by the authorized party.

FIG. 2 illustrates the computation of a message authentication code in the UTRAN. The length of the MAC-I used in UTRAN is 32 bits.

The UMTS integrity algorithm used in block 200 is a one-way cryptographic function for calculating the Message Authentication Code (MAC-I) based on the input parameters shown in FIG. 2. The one-way function means that it is impossible to derive the unknown input parameters from a MAC-I, even if all but one input parameter are known.

The input parameters for calculating the MAC-I are the actual signaling message (after encoding) to be sent, a secret integrity key, a sequence number COUNT-I for the message to be integrity protected, a value indicating the direction of transmission, i.e. whether the message is sent in uplink (from the user terminal to the network) or downlink (from the network to the user terminal) direction, and a random number (FRESH) generated by the network. COUNT-I is composed of a short sequence number SN and a long sequence number called hyper frame number HFN. Only the short sequence number is normally sent with the message; the HFN is updated locally at each communicating party.

The computing block 200 calculates the message authentication code by applying the afore-mentioned parameters to the integrity algorithm, which is called f9 algorithm in 3GPP Release'99 specifications. It is possible that more algorithms will be available in future releases of new specifications. Before integrity protection is started, the user terminal informs the network, which integrity algorithms it supports, and the network then selects one of these algorithms to be used for the connection. A similar mechanism regarding the supported algorithms is also used for the ciphering.

FIG. 3 illustrates a message to be sent over e.g. a radio interface. The message is a layer N protocol data unit (PDU) 300, which is transferred as a payload in layer N–1 PDU 301. In the present example, layer N represents the Radio Resource Control (RRC) protocol in the radio interface and layer N–1 represents the Radio Link Control (RLC) layer. The layer N–1 PDU normally has a fixed size, which depends on the physical layer (the lowest layer, not visible in FIG. 2) channel type used and on the parameters, e.g. modulation, channel coding, interleaving. If layer N PDUs are not exactly the size of the payload offered by layer N–1 as is normally the case, layer N-1 can utilize functions like segmentation, concatenation, and padding to make layer N–1 PDUs always a fixed size. In the present application we are concentrating on a layer N PDU consisting of the actual signaling data and the Integrity Check Info. The Integrity Check Info consists of the MAC-I and the message sequence number SN needed at the peer end for the recalculation of MAC-I. The total length of the message is then a combination of the signaling data bits and the Integrity Check Info bits.

FIG. 4 illustrates intersystem handover from a radio access network to a GSM base station subsystem. For simplicity only one mobile switching center is shown in the FIG. 4. Actually it consists of a GSM (2G or second generation) mobile switching center MSC and a UMTS (3G or third generation) mobile switching center, which may be physically either one or two separate MSC's. Interaction between these two mobile switching centers (if they would be two separate entities) is not essential in view of the actual invention and therefore it is not described in the following.

At the beginning, a connection exists between the user terminal and the radio access network, which in this particular example is a UTRAN. Based on various parameters, e.g. the neighboring cell load information, measurements from the user terminal, and the existence of GSM cells in the nearby geographical area as well as existence of the user terminal capabilities (to support also GSM mode), the radio access network may initiate an intersystem handover to base station subsystem BSS. First, the UTRAN requests the user terminal to start intersystem measurements on GSM carriers by sending a MEASUREMENT CONTROL message 400 containing intersystem specific parameters. When the criteria (as described in the MEASUREMENT CONTROL message) to send a measurement report is fulfilled, the user terminal sends a MEASUREMENT REPORT(s) 401. Intersystem handover decision is then made at the UTRAN. After the decision a serving radio network controller SRNC, which is located in the UTRAN, sends a RELOCATION REQUIRED 402 message through Iu interface to the mobile switching center (3G MSC). Once after receiving, the message the mobile switching center (2G MSC) sends a HANDOVER REQUEST message 403 to a target base station subsystem, containing information, such as the ciphering algorithm and ciphering key to be used for the connection, and the MS classmark information, indicating, for example, which ciphering algorithms are supported by the user terminal. Thus, it is possible that either the mobile switching center MSC selects the ciphering algorithm and indicates only the selected algorithm to the base station subsystem BSS, or that the mobile switching center MSC sends a list of possible ciphering algorithms to the base station subsystem BSS, which then makes the final selection. The MS classmark information was sent by the user terminal to the mobile switching center MSC at the beginning of the (UMTS) connection. It is also possible that the MS classmark information is sent from the user terminal to the UMTS radio access network (UTRAN) at the beginning of the (UMTS) connection. When an inter-system handover from UMTS to GSM is triggered, the MS classmark information is forwarded from UTRAN to MSC. When a GSM base station controller receives the message it makes reservation from the indicated GSM cell and responds by sending back a HANDOVER REQUEST ACK message 404 indicating that the requested handover at the base station subsystem BSS can be supported and also to which radio channel(s) the user terminal should be directed. The HANDOVER REQUEST ACK 404 also indicates that the requested handover algorithm has been accepted, or, if the HANDOVER REQUEST 403 contained several algorithms, which handover algorithm has been selected. If the base station subsystem BSS is not able to support any of the indicated ciphering algorithms, it returns a HANDOVER FAILURE message (instead of 404) and the mobile switching center MSC indicates failure of the handover to the UTRAN. At stage 405, the mobile switching center (3G MSC) responds with a RELOCATION COMMAND message over the Iu interface to the message sent at stage 402 from the serving radio network controller located in the UTRAN. The RELOCATION COMMAND carries in a payload e.g. the information about the target GSM channels together with the cipher mode information. The UTRAN commands the user terminal to execute the handover by sending an INTERSYSTEM HANDOVER COMMAND 406 message including channel information for the target GSM. In addition, other information may be included, such as the GSM cipher mode setting information, which indicates at least the ciphering algorithm to be used in the GSM connection. After having switched to the assigned GSM channels, the mobile station normally sends four times the HANDOVER ACCESS message 407 in four successive layer 1 frames on the main DCCH. These messages are sent in GSM access bursts, which are not ciphered. In some situations it may not be necessary to send these HANDOVER ACCESS messages, if so indicated in the INTERSYSTEM HANDOVER COMMAND 406. The terminal may receive a PHYSICAL INFORMATION 408 message as a response to the HANDOVER ACCESS messages. The PHYSICAL INFORMATION message contains only the GSM Timing Advance information. Reception of a PHYSICAL INFORMATION message causes the terminal to stop sending access bursts. The HANDOVER ACCESS messages, if used, trigger the GSM base station controller in the base station system to inform about the situation to the mobile switching center (2G) with a HANDOVER DETECT message 409.

After lower layer connections are successfully established, the mobile station returns a HANDOVER COMPLETE 410 message to the GSM base station subsystem on the main DCCH. When receiving the HANDOVER COMPLETE message 410, the network releases the old channels, in this example the UTRAN channels. In FIG. 4, three messages from this release procedure are shown, although in reality many other messages between network elements, which are not shown in FIG. 4, would be needed. These three messages are first the HANDOVER COMPLETE message 411 from GSM base station subsystem to the mobile switching center, then a IU RELEASE COMMAND 412 through Iu interface to the UTRAN or more accurately to the serving radio network controller. The third message is the IU RELEASE COMPLETE message 413.

The ciphering key to be used after the intersystem handover is derived with a conversion function from the ciphering key used in UTRAN before the handover. This conversion function exists both in the mobile station and in the mobile switching center, thus no extra procedures over the radio interface are needed. As described above, the GSM ciphering algorithm to be used after the intersystem handover is selected either by the MSC or by the BSS and informed to the mobile station (in messages 405 and 406). The GSM Ciphering algorithm capability (included in the GSM MS classmark information elements) is in current specifications transparent to the UTRAN. However, the GSM MS classmark information elements are sent from the mobile station to UTRAN during the RRC Connection Establishment procedure, to be later forwarded to the core network during the inter-system handover to GSM.

FIG. 5 is a signaling diagram showing the basic connection setup and security mode setup procedure used in the 3GPP UTRAN. FIG. 5 shows only the most important signaling between a mobile station and a serving radio network controller residing in the radio access network on the one hand and the serving radio network controller and a mobile switching center or a serving GPRS support node on the other.

Establishment of a radio resource control (RRC) connection between the mobile station and the serving radio network controller is performed through Uu interface 500. During RRC connection establishment, the mobile station may transfer information such as the user equipment security capability and the START values, which are required for the ciphering and integrity protection algorithms. The user equipment security capability includes information about the supported (UMTS) ciphering algorithms and (UMTS) integrity algorithms. All the values mentioned above are stored for later use in the serving radio network controller at stage 501. Also the GSM Classmark information (MS Classmark 2 and MS Classmark 3) is transmitted from the mobile station to UTRAN during RRC connection establishment, and it can be stored for later use in the serving radio network controller.

Next the mobile station sends an initial higher layer message 502 (which can be e.g. CM SERVICE REQUEST, LOCATION UPDATING REQUEST or CM RE-ESTABLISHMENT REQUEST) via the serving radio network controller through a Iu interface to the mobile switching center, including e.g. the user identity, a key set identifier KSI and the MS classmark indicating, for example, the supported GSM ciphering algorithms when intersystem handover to the GSM is initialized. The network initiates authentication procedure which also leads to generation of new security keys 503. Next, the network decides the set of UMTS Integrity Algorithms UIAs and UMTS Encryption Algorithms UEAs from which the UIA and UEA for this connection has to be selected 504. Then, at stage 505, the mobile switching center sends a SECURITY MODE COMMAND message to the serving radio network controller, in which it informs the used ciphering key CK, integrity key IK, and the set of permissible UIAs and UEAs.

On the basis of the user equipment security capabilities stored at stage 501 and the list of possible UIAs and UEAs received from the mobile switching center at stage 505, the serving radio network controller selects the algorithms to be used during the connection. It also generates a random value FRESH to be used as input parameter for the integrity algorithm (FIG. 2) and for the ciphering algorithm. It also starts deciphering and the integrity protection 506.

A first integrity protected message SECURITY MODE COMMAND 507 is sent through the radio interface from the serving radio network controller to the mobile station. The message includes the selected UIA and UEA together with the UE FRESH parameter to be used. In addition, the SECURITY MODE COMMAND contains the same UE security capability which was received from the user equipment during the RRC connection establishment 500. The reason for replaying this information back to UE is to give the user equipment a possibility to check that the network has received this information correctly. This mechanism is necessary, since the messages sent during RRC connection establishment 500 are not ciphered nor integrity protected. A message authentication code MAC-I, used for the integrity protection, is attached to the SECURITY MODE COMMAND message 507.

At stage 508 the mobile station compares whether the received UE security capability is same as that which has been sent during the RRC connection establishment procedure 500. If the two UE security capabilities match, the mobile station can trust that the network has received the security capability correctly. Otherwise, the UE releases the RRC connection and enters idle mode.

If comparison is successful the mobile station responds with a SECURITY MODE COMPLETE message 509. This is also an integrity protected message; thus before sending this message the mobile station generates the MAC-I for the message.

When the serving radio network controller receives the message it verifies it, at stage 510, first by calculating the expected message authentication code XMAC-I and then comparing the calculated XMAC-I with the received MAC-I. If the values match, the serving radio network controller sends a SECURITY MODE COMPLETE message 511 to the mobile switching center including e.g. information of the selected UIA and UEA.

In the UTRAN radio interface integrity protection is a function of the radio recourse control protocol between the user terminal and the radio network controller. All higher layer signaling is integrity protected by the radio resource control protocol layer because all higher layer signaling is carried as a payload in specific radio recourse control messages (e.g. INITIAL DIRECT TRANSFER, UPLINK DIRECT TRANSFER, DOWNLINK DIRECT TRANSFER). The problem is that no authentication can be performed before the first higher layer message is sent, which is carried in the INITIAL DIRECT TRANSFER. This leads to a situation where the very first higher layer i.e. the non-access stratum message 502 cannot be integrity protected.

A major problem arises from the fact that integrity protection is not yet in effect when the first messages are sent during RRC Connection Establishment (step 500 in the FIG. 5). Without integrity protection there is always a risk that an intruder changes the encryption algorithm information included in the messages at step 500 into the value "GSM encryption algorithms not available". In the case of GSM, the core network receives this information with the mobile station classmark CM information elements (CM2 and CM3) that are included in the RELOCATION REQUIRED message (message 402 in FIG. 4). When the user equipment carries out an intersystem handover, e.g. from the UTRAN to the GSM base station subsystem BSS (FIG. 4) the mobile switching center recognizes that the UE does not support any GSM ciphering algorithms and must set up the connection in the GSM BSS with no ciphering. Now it is easy to the intruder to start eavesdropping of the call.

SUMMARY OF THE INVENTION

An objective of the present invention is to devise a mobile telecommunications system that reveals an attempt of a fraudulent intruder to remove information about an encryption algorithm when a multimode mobile station sends an unprotected signaling message containing this information over radio interface to the mobile telecommunications system. According to existing specifications, this signaling message is RRC CONNECTION SETUP COMPLETE.

The system comprises at least two radio access networks providing mobile stations with access to at least one core network, a multimode mobile station, and at least one core network. The multimode mobile station sends, during connection setup with a first radio access network, at least one unprotected signaling message, including information about encryption algorithms supported by the multimode mobile station in a second radio access network. The core network receives information about the encryption algorithms via the first radio access network when a handover to the second radio access network is triggered (message 402 in FIG. 4). The first radio access network has inventive features. Namely, in receipt of a command message from the core network instructing the multimode mobile station to cipher further communication in the first radio access network, the first radio access network composes an integrity protected command message that includes information about the encryption algorithms supported by the multimode mobile station in the second radio access network.

The protected command message comprises a payload and a message authentication code. The information about the supported algorithms in the second radio access network is located either in the payload or the information is used as a parameter when computing the message authentication code.

In both cases the multimode mobile station is able to conclude from the protected message received whether the information embedded in the message corresponds to the information sent by the multimode mobile station in the previous signaling message. If the information sent and the information received by the multimode mobile station differ from each other, it is likely that a fraudulent intruder has changed the encryption information. Then the multimode mobile station initiates release of the connection.

BRIEF DESCRIPTION OF THE DRAWINGS

The invention is described more closely with reference to the accompanying drawings, in which

FIG. 2 depicts the computation of a message authentication code;

FIG. 3 shows the contents of a message;

DETAILED DESCRIPTION OF THE PREFERRED EMBODIMENT

The idea of the method described in the following is to increase security in telecommunications network, especially security pertaining to signaling through the radio interface.

It is to be noted that all the terms "terminal", "user terminal", "mobile station" and "user equipment" refer to the same equipment.

Most signaling messages sent between a user terminal and the network, for example, must be integrity protected. Examples of such messages are RRC, MM, CC, GMM and SM messages. Integrity protection is applied at the RRC layer, both in the user terminal and in the network.

Integrity protection is usually performed for all RRC (Radio Recourse Control) messages, with some exceptions. These exceptions can be:

1. messages assigned to more than one recipient,
2. messages sent before the integrity keys were created for the connection, and
3. frequently repeated messages, including information not needing integrity protection.

Due to security, it is especially important to integrity protect the initial messages mentioned in alternative 2, or at least critical information elements in them. As already mentioned, without integrity protection there is always a risk that an intruder changes the encryption algorithm information included into message 500 to the value "encryption algorithm is not available".

There are several different ways of implementing the functionality required to increase security but only some of solutions are shown.

The invention is now described in detail with four examples by referring to FIG. 6-9.

In the beginning a connection is established between a user terminal and a UMTS network. Afterwards a handover is carried out from the UMTS network to a GSM network.

Figure 1:
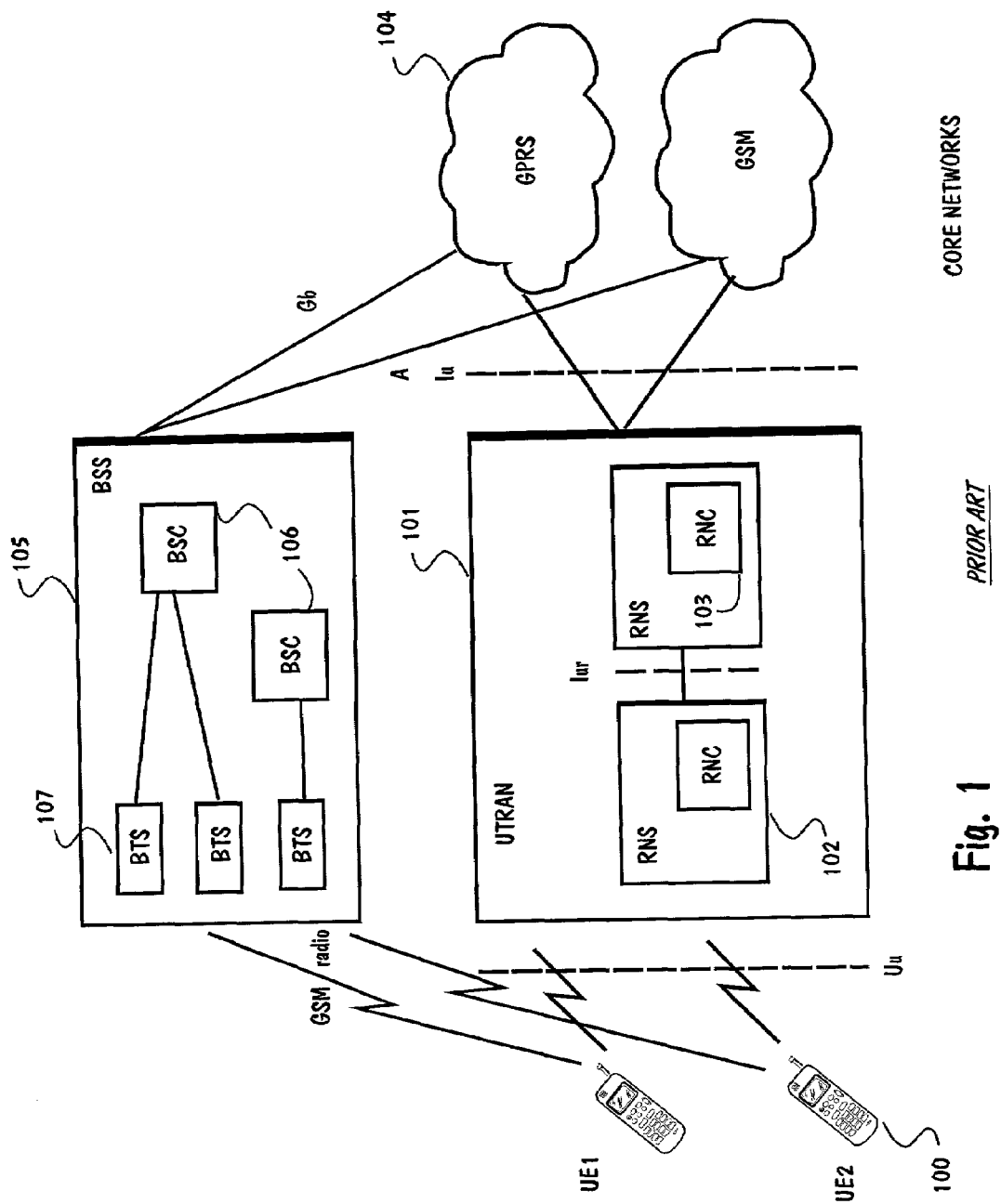
FIG. 1 illustrates with a simplified block diagram a GSM and a UMTS radio access networks, connected to the same core network.
Figure 4:
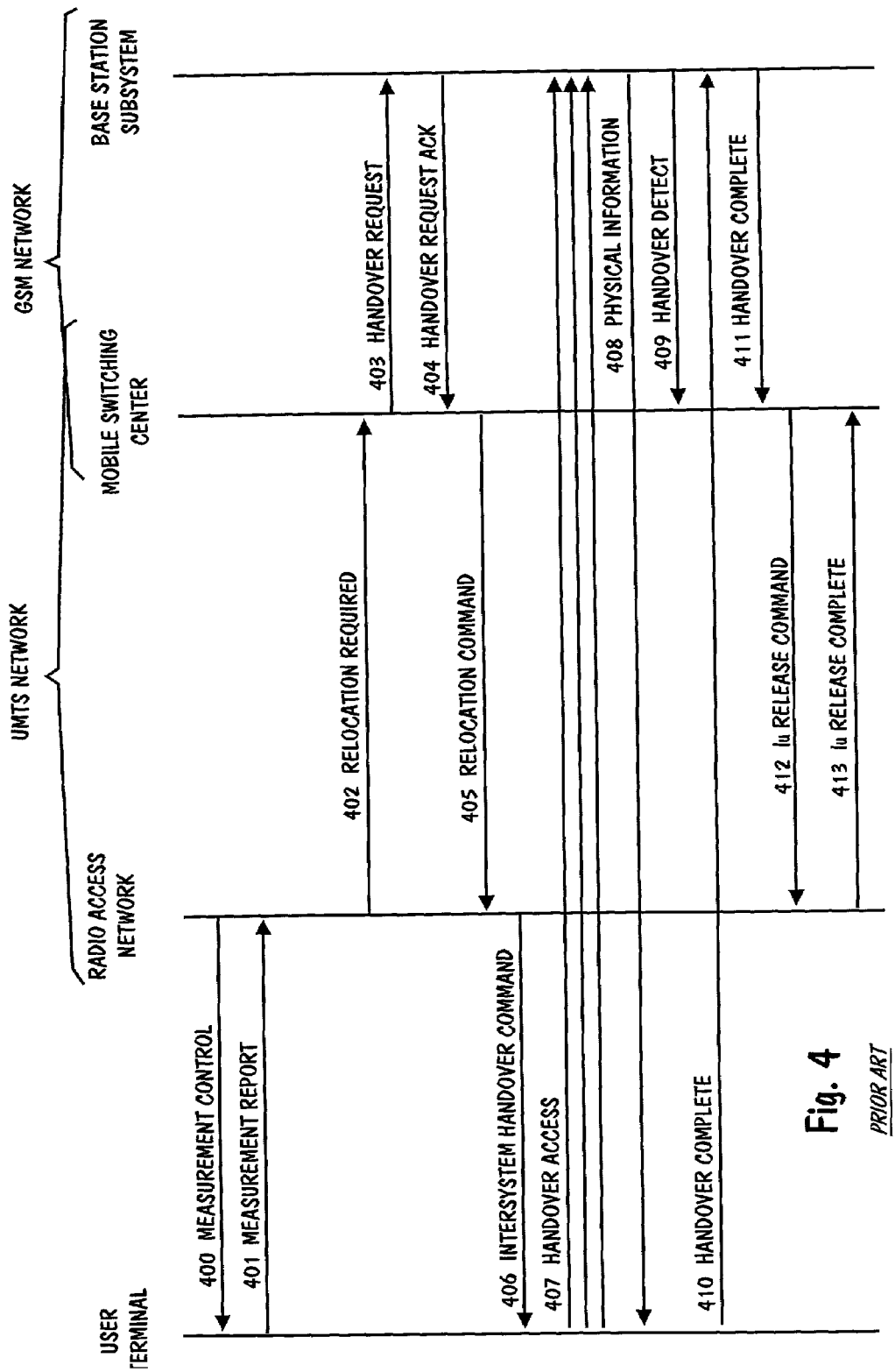
FIG. 4 is a signaling chart illustrating intersystem handover from the UMTS network to the GSM network.
Figure 5:
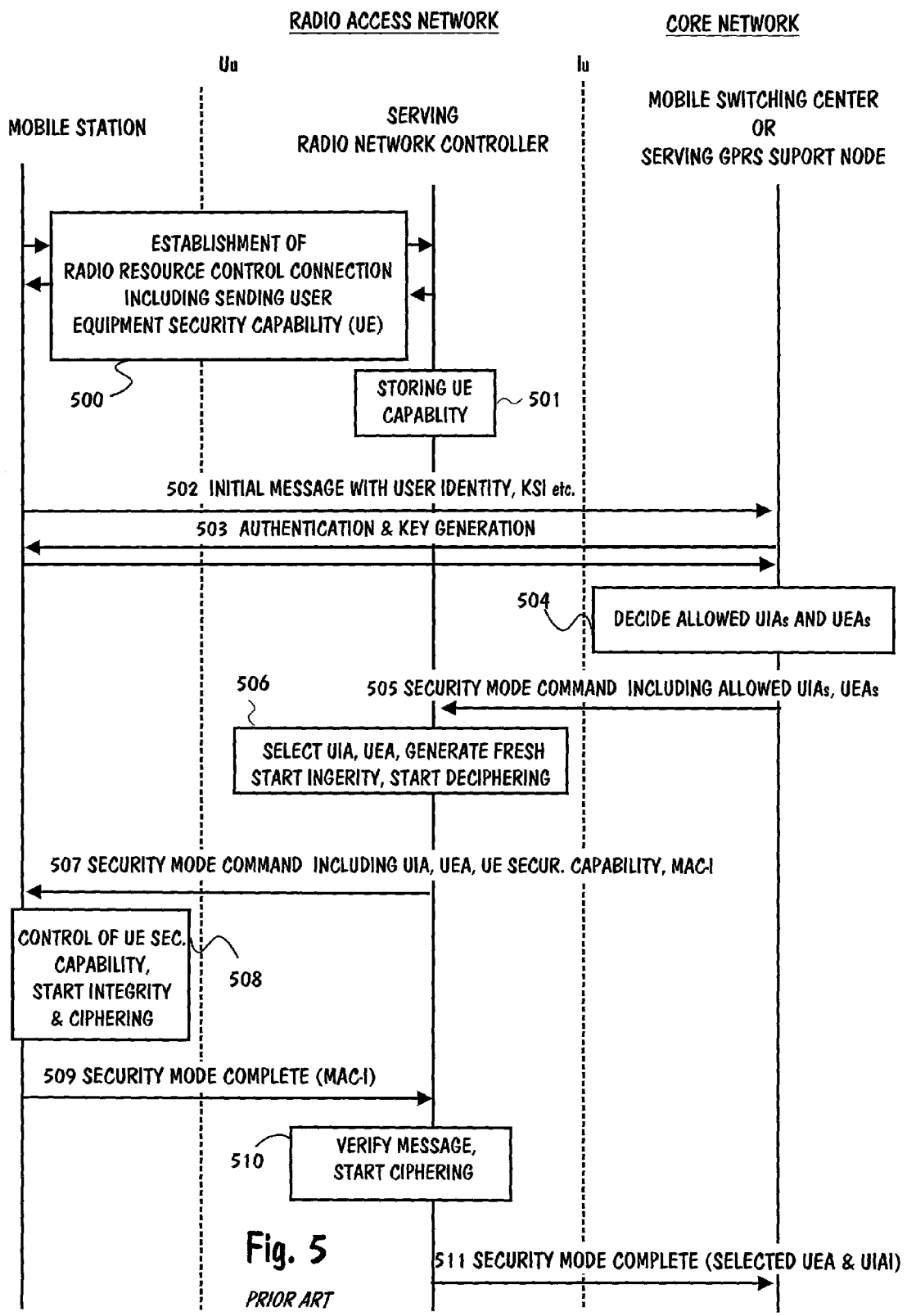
FIG. 5 is a signaling chart showing the basic connection setup and security mode setup procedure used in the 3GPP UTRAN.
Figure 6:
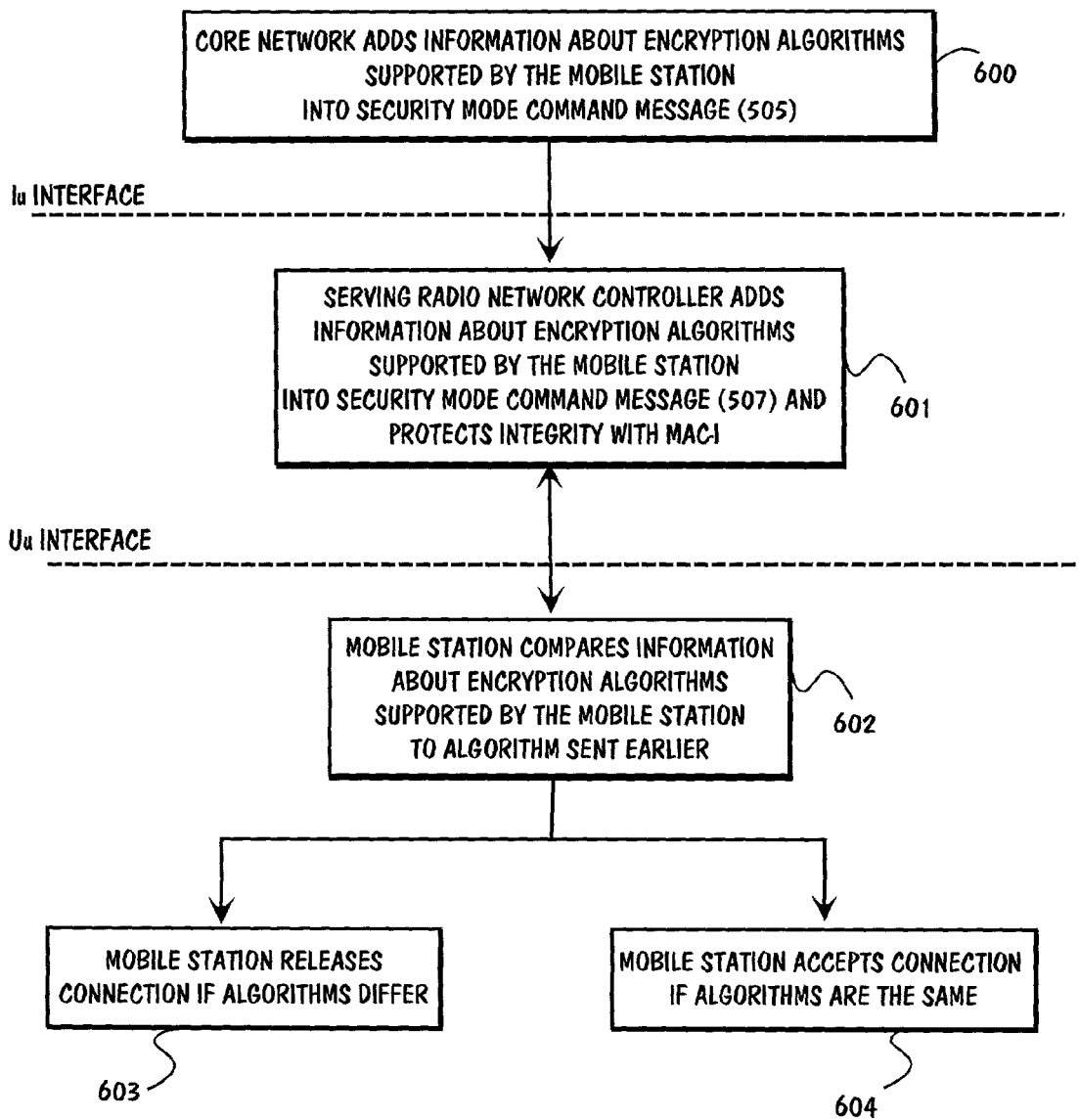
FIG. 6 shows as a flowchart of the first example of the implementation of the method according to the invention.

FIG. 6 shows as a flowchart of one implementation of the method according to the invention. It is assumed that signaling corresponds to the situation shown in FIG. 5 until the core network receives message 503.

In addition it is assumed that the user terminal is a dual mode (UMTS/GSM) terminal, which on the UMTS mode sends the first non-access-stratum message over the radio interface in a radio resource control INITIAL DIRECT TRANSFER message (corresponding message 502 in FIG. 5). It is further assumed that the RRC Connection Establishment (500) has been performed, thus the user terminal was in an idle state and had no existing RRC Connection when a request arrived to set up a connection with the core network.

The core network receives GSM classmark information in the initial message 502 from the user terminal, here the mobile station. This information indicates general mobile station characteristics in the GSM mode including information about which GSM ciphering algorithms are supported at the terminal when it is in GSM mode. The term "classmark" has to be understood as GSM specific; another term may be used in other systems. The mobile switching center in the core network adds information about encryption algorithms supported by the mobile station into the SECURITY MODE COMMAND message 600. The message is sent to the serving radio network controller through the Iu interface. The serving radio network controller adds this information about encryption algorithms supported by the mobile station, including information about supported encryption algorithms, to a SECURITY COMMAND message before encoding 601. A 32-bit message authentication code MAC-I is computed and added to the encoded message.

Besides the encoded message the MAC-I code is also based on several other parameters. The following input parameters are needed for computation of the integrity algorithm: the encoded message, the 4-bit sequence number SN, the 28-bit hyper-frame number HFN, the 32-bit random number FRESH, the 1-bit direction identifier DIR, and the most important parameter—the 128-bit integrity key IK. The short sequence number SN and the long sequence number HFN together compose the serial integrity sequence number COUNT-I.

When the message authentication code is computed using the integrity algorithm and the above parameters, it is guaranteed that no one other than the actual sender can add the correct MAC-I code to the signaling message. COUNT-I, for example, prevents the same message from being sent repeatedly. However, if the same signaling message for some reason or other is to be sent repeatedly, the MAC-I code differs from the MAC-I code that was in the previously sent signaling message. The aim of this is to protect the message as strongly as possible against eavesdroppers and other fraudulent users. Thus, for this particular invention, it is important to note that also the GSM information about encryption algorithms supported by the mobile station is added to the SECURITY MODE COMMAND message 507, is integrity protected, so that the mobile station can be sure that this information has not been changed by an intruder.

Next, at stage 602, when the mobile station receives the SECURITY MODE COMMAND message, the information about encryption algorithms supported by the mobile station received with this message is compared with the information about encryption algorithms supported by the mobile station sent earlier from the mobile station to the network in the initial message 502. Correspondingly, according to prior art, the received UE (UMTS) security capability parameter is compared with the sent UE security capability parameter. If both comparisons are successful the mobile station accepts the connection 604, otherwise the connection is released 603.

Figure 7:
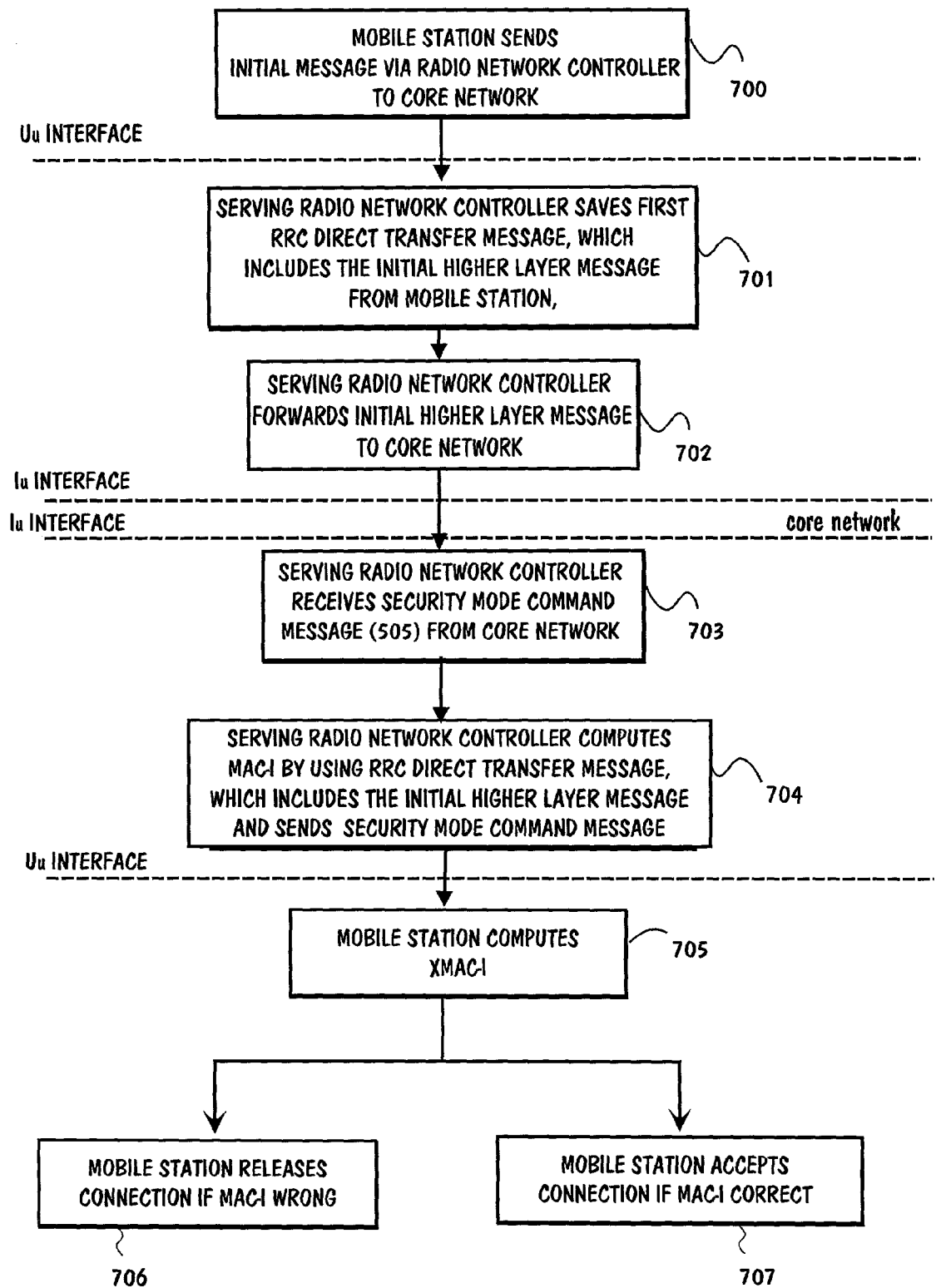
FIG. 7 shows as a flowchart of a second example of the implementation of the method according to the invention.

FIG. 7 shows as a flowchart of the second implementation of the method.

At stage 700 the mobile station sends an INITIAL DIRECT TRANSFER message (corresponding to message 502 in FIG. 5) to the core network via the serving radio network controller in the radio access network. The message consists of two main parts: a RRC part and a non-access stratum part, which is seen by the RRC as a transparent payload. Moreover, the payload part includes one of the following messages: CM SERVICE REQUEST, LOCATION UPDATING REQUEST, CM RE-ESTABLISHMENT REQUEST or PAGING RESPONSE.

When the serving radio network controller receives the message it stores the message 701 and forwards the payload part or the NAS part through the Iu interface to the core network 702. The core network responds with the normal SECURITY MODE COMMAND message 703. As in the previous example, the message authentication code MAC-I is computed to protect the message to be transmitted to the mobile station. The code is then added to the message. The message authentication code depends in a specified way on the message that it is protecting. Here computation is carried out using the following concatenated bit string as a MESSAGE parameter:

MESSAGE=SECURITY MODE COMMAND+RRC CONNECTION REQUEST+RRC INITIAL DIRECT TRANSFER.

Thereafter, the integrity protected SECURITY MODE COMMAND message is sent to the mobile station 704.

It should be noted that in this solution it is unnecessary to include the UE (UMTS) security capability parameter into the above message. However, both security related parameters, i.e. the UE security capability parameter and the GSM classmark parameter were input parameters when the MAC-I code was computed.

The receiving end, i.e. the mobile station, has the identical algorithm for computing the message authentication code in order to verify that the message authentication code received is the same as the computed code 705. Thus, the mobile station has saved the messages earlier sent, the RRC CONNECTION REQUEST message (500) and the RRC INITIAL DIRECT TRANSFER message (502) in order to calculate XMAC-I for the received SECURITY MODE COMMAND message. When the MAC-I value received and the computed XMAC-I value match, the mobile station assumes that the network has received correct information as to the security capability and the GSM classmarks, and the connection is accepted 707. Otherwise the connection is released 706.

There is one drawback of this solution, which is that the encoded messages RRC CONNECTION REQUEST and RRC INITIAL DIRECT TRANSFER must be stored in the memory of both the serving radio network controller and the mobile station until the SECURITY MODE COMMAND message has been sent/received. But on the other hand, this solution makes it possible to omit the UE security capability from the prior art SECURITY MODE COMMAND message and in this way to save 32 bits space in the message.

Figure 8:
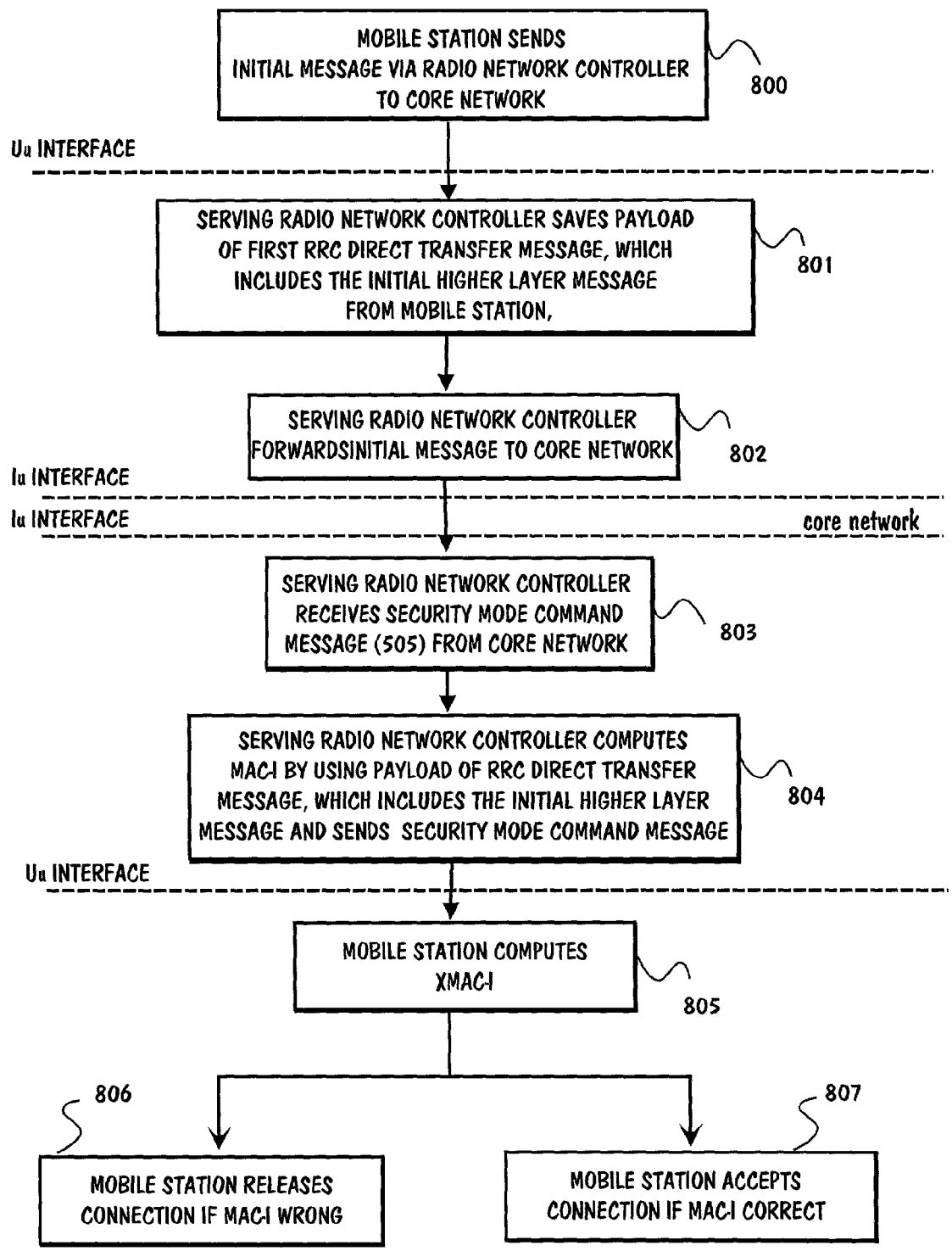
FIG. 8 shows as a flowchart of a third example of the implementation of the method according to the invention.

FIG. 8 shows as a flowchart of the third implementation of the method.

This solution differs slightly from the second solution, i.e. only blocks 801, 804 and 805 differ from the blocks in FIG. 7. Therefore, these two blocks are now described in detail.

At stage 801, instead of storing the whole message the serving radio network controller stores only the payload part of the message for later use. In other words, it stores one of the following messages: CM SERVICE REQUEST, LOCATION UPDATING REQUEST, CM RE-ESTABLISHMENT REQUEST or PAGING REQUEST. Thus, this solution saves memory space as compared to the second solution.

At stage 804, to protect the message the message authentication code MAC-I is computed by using the previously stored payload. The MESSAGE is formed in this case as follows:

MESSAGE=SECURITY MODE COMMAND+UE SECURITY CAPABILITY+NAS message part of the INITIAL DIRECT TRANSFER message.

Only the SECURITY MODE COMMAND message is sent over the Uu interface to the mobile station. This means that both the security parameters for the UE security capability and the GSM MS classmarks are used in computing the message authentication code MAC-I, but there is no need to include them in the message. However, this does not in any way decrease the security.

At stage 805 the mobile station computes the XMAC-I by using the same MESSAGE parameter as the network used at stage 804, i.e. the parameters, which were saved earlier of the UE Security Capability and the NAS message part of the INITIAL DIRECT TRANSFER message.

Figure 9:
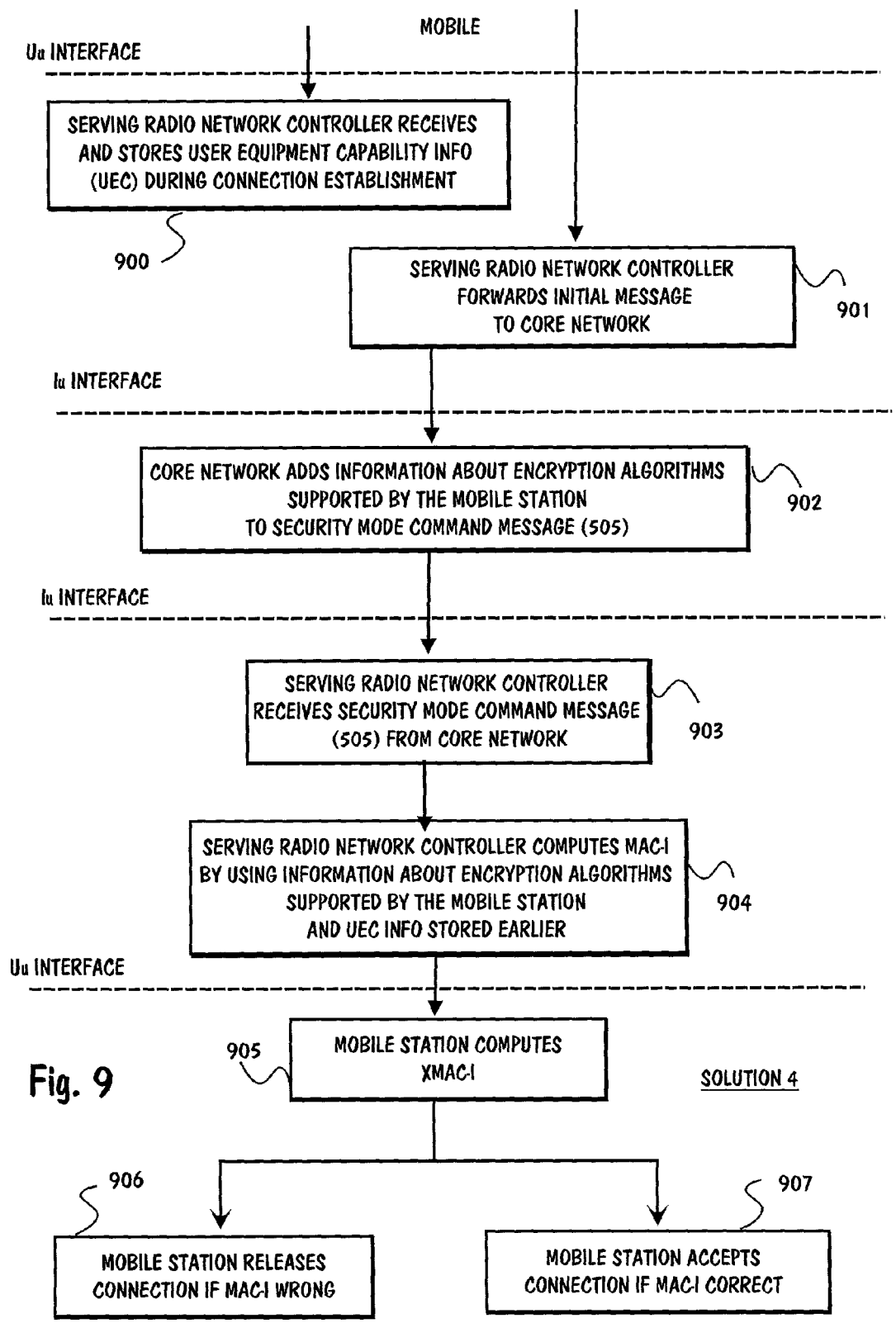
FIG. 9 shows as a flowchart of a fourth example of the implementation of the method according to the invention.

FIG. 9 shows as a flowchart the fourth implementation of the method. This solution is a combination of the first and the third solutions.

During connection establishment between the mobile station and the serving radio network controller in the radio access network, the latter receives and stores the user equipment capability information UEC in its memory for later use 900. After that the mobile station sends the first nonaccess stratum message containing e.g. information about encryption algorithms supported by the mobile station, as a payload in a RRC INITIAL DIRECT TRANSFER message to the radio access network, which forwards the NAS message to the core network 901. The mobile switching center in the core network adds the information about encryption algorithms supported by the mobile station parameter to the SECURITY MODE COMMAND message and sends the message through the Iu interface to the serving radio network controller in the radio access network, at stage 902 and 903.

At stage 904 the serving radio network controller computes the MAC-I code in the previously described way, adding to the earlier described parameters the MESSAGE parameter, which is formed as follows:

MESSAGE=SECURITY MODE COMMAND+UE SECURITY CAPABILITY+GSM CLASSMARKS.

In the same way as in the previous example, both the security parameters UE security capability and the GSM classmark are used for computing the message authentication code MAC-I, but there is no need to include them in the message. The advantage of this solution is that no additional memory is needed in the mobile station or in the radio network controller.

It is essential that in the solutions described above the core network is a 3G network element, thus controlling at least UMTS Radio Access Network and optionally also the GSM Base Station Subsystem.

Implementation and embodiment of the present invention has been explained above with some examples. However, it is to be understood that the invention is not restricted to the details of the above embodiment and that numerous changes and modifications can be made by those skilled in the art without departing from the characteristic features of the invention. The embodiment described is to be considered illustrative but not restrictive. Therefore, the invention should be limited only by the attached claims. Thus, alternative implementations defined by the claims, as well as equivalent implementations, are included in the scope of the invention.

For example, the source radio access network can be, for example, the UTRAN, the GSM base station subsystem, the GPRS system (General Packet Radio Service), the GSM Edge, the GSM 1800, or some other system. Correspondingly, the target radio access network can be, for example, the UTRAN, the GSM base station subsystem, the GPRS (General Packet Radio Service), the GSM Edge, the GSM 1800, or some other system.

Furthermore, information about GSM security algorithms (A5/1, A5/2, A5/3, etc.) that are supported by the multi-mode mobile terminal can be added as a part of the UMTS "UE Radio Access Capability". Alternatively, the information can be a separate information element or even a part of the UE security capability parameter. In practice this information must be added to the RRC connection establishment procedure (see stage 500 in FIG. 5), as well as to the SECURITY MODE COMMAND message (see stage 507 in FIG. 5). Like in the other possible implementations described earlier, also in this case adding the actual "Inter-RAT Radio Access Capability" (including information about supported GSM security algorithms) information element to the RRC SECURITY MODE COMMAND message is just one alternative and introduces some overhead to the signaling, since the mobile does not necessarily need this information element, but only a confirmation that the network has received it correctly. Three alternative solutions, i.e. the fifth, sixth, and seventh example implementations of the method are described in the following.

In the fifth example of the implementation of the method, a new RRC information element, including only the GSM ciphering algorithm capability, is defined. This requires 7 bits. This information element is then added to the RRC SECURITY MODE COMMAND message. The drawback of this solution is that to encode this new information element into the said message, UTRAN RRC protocol first has to decode the GSM classmark 2 and classmark 3 information elements, whose encoding/decoding rules are not part of the UTRAN RRC protocol.

Figure 10:
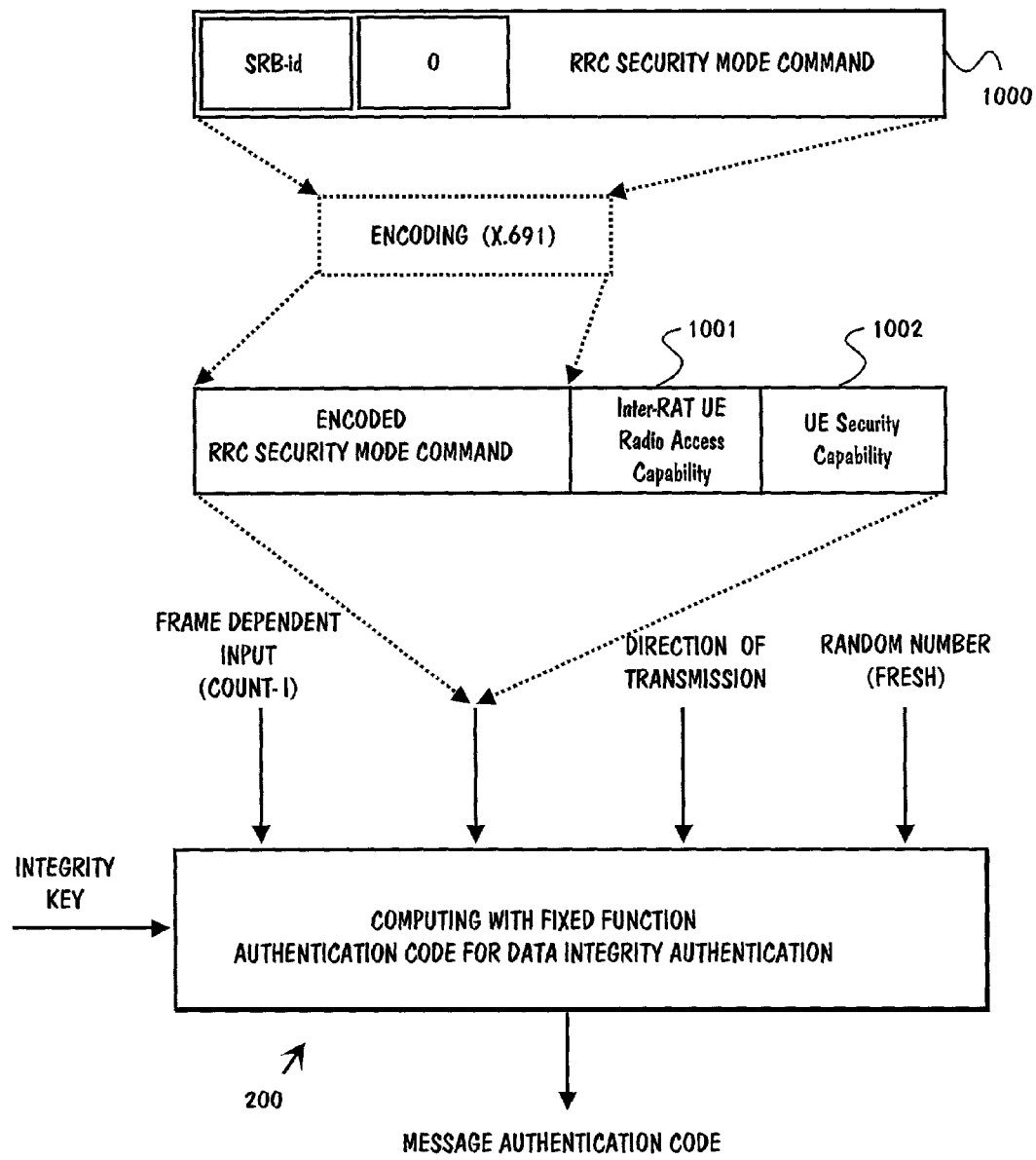
FIG. 10 shows a fifth example of the implementation of the method according to the invention.

FIG. 10 illustrates the sixth example of the implementation of the method. On the UTRAN side, the GSM Classmark 2 and Classmark 3 information received (RRC information element "Inter-RAT UE radio access capability" 1001), together with the "UE Security Capability" 1002 (containing information about supported UTRAN security algorithms), are used for calculating MAC-I (and XMAC-I) for the RRC SECURITY MODE COMMAND message 1000. This is essentially the same solution as in FIG. 9 with the exception that the GSM Classmark information (from the mobile station and not from the core network (902)) has already been received and stored in the serving radio network controller during the RRC Connection Establishment phase (900). The SECURITY MODE COMMAND to be sent to the mobile station does not contain "UE security capability" nor "Inter-RAT UE radio access capability"; these information elements are only used when calculating the MAC-I for this message.

Figure 11:
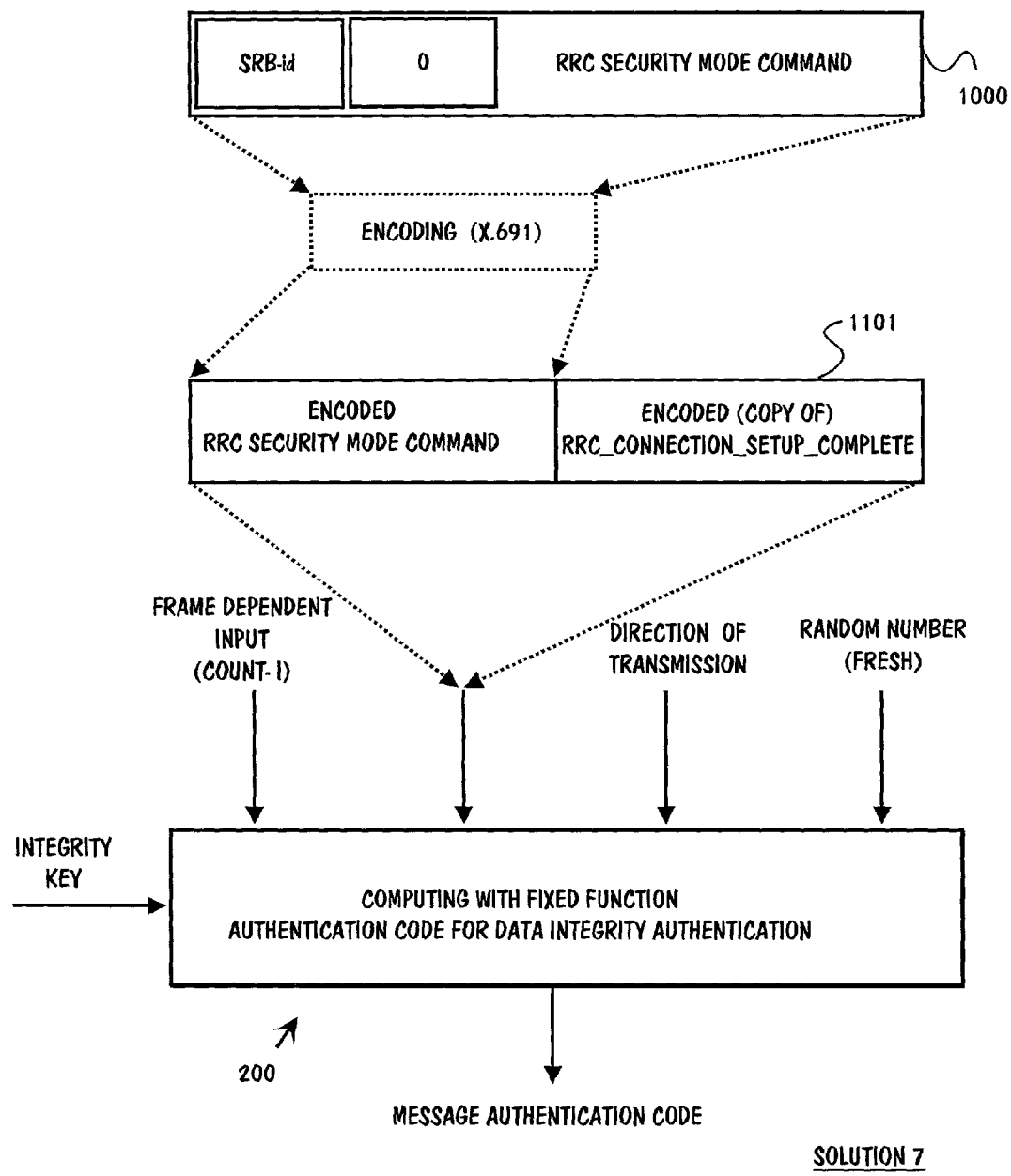
FIG. 11 shows a sixth example of the implementation of the method according to the invention.

The drawback of the sixth implementation is that the coding of the extra information elements ("UE security capability" and "Inter-RAT UE radio access capability") used for the MAC-I calculation has to be explicitly defined. If this is not acceptable, a more straightforward implementation is shown in FIG. 11 (a seventh implementation of the method). Here the entire encoded RRC_CONNECTION_SETUP_COMPLETE message is used when calculating MAC-I (and XMAC-I) for the RRC_SECURITY_MODE_COMMAND message 1000 (instead of the two information elements only as in the sixth implementation). In practice this means that during the RRC connection establishment procedure (see stage 500 in FIG. 5), when sending the RRC_CONNECTION_SETUP_COMPLETE message the mobile station must save a copy of the encoded message in its memory until it receives the SECURITY_MODE_COMMAND message and has checked its integrity checksum. On the network side (in the case of UTRAN in the serving radio network controller) a copy of the (non-decoded) RRC_CONNECTION_SETUP_COMPLETE message received must be kept in the memory until the MAC-I code for the SECURITY_MODE_COMMAND message has been calculated. From the standpoint of implementation, it is probably quite easy to save the entire encoded message in the memory before it is sent (UE side) or just after receiving it and before it is passed to the decoder (UTRAN side). Thus, MAC-I for SECURITY_MODE_COMMAND would be calculated by setting the MESSAGE-input parameter for the integrity algorithm as:

MESSAGE=SECURITY_MODE_COMMAND+
RRC_CONNECTION_SETUP_COMPLETE

The drawback here, as compared to the sixth example of the implementation of the method, is that this solution requires a bit more memory, both in the mobile station and on the network side. The GSM classmark information includes the encryption algorithms supported by the mobile station.

The invention claimed is:

1. An apparatus, comprising:
a receiver, of a radio access network, configured to receive via a radio interface an unprotected signaling message including information about encryption algorithms supported by a multimode mobile station in a further radio access network, the further radio access network being different from the radio access network;
wherein said radio access network is configured to compose an integrity protected command message including information relating to the encrypting algorithms supported by the multimode mobile station in said further radio access network, said integrity protected command message comprising a payload and a message authentication code; and
a sender configured to send said integrity protected command message to said multimode mobile station.

2. The apparatus as defined in claim 1, wherein the radio access network is configured to attach information about the encryption algorithms supported by the multimode mobile station in said further radio access network received in said unprotected signaling message to said payload and to apply said payload in an algorithm computing said message authentication code.

3. The apparatus as defined in claim 1, wherein the radio access network is configured to save the unprotected signaling message and to use the unprotected signaling message in an algorithm computing said message authentication code.

4. The apparatus as defined in claim 1, wherein the radio access network is configured to save a payload of the unprotected signaling message and to use the payload of the unprotected signaling message in an algorithm computing said message authentication code.

5. The apparatus as defined in claim 1, wherein the radio access network is configured to save information about the encryption algorithms supported by the multimode mobile station in said farther radio access network and to use information about the encryption algorithms supported by the multimode mobile station in said farther radio access network together with information about encryption algorithm embedded in a command message received from a core network in computing said message authentication code.

6. The apparatus as defined in claim 1, wherein the radio access network is configured to omit information about the encryption algorithms supported by the multimode mobile station in said farther radio access network and information about the security capability of said multimode mobile station in said radio access network in the integrity protected command message.

7. The apparatus as defined in claim 1, wherein the radio access network is configured to include information about the encryption algorithms supported by the multimode mobile station in said further radio access network in the integrity protected command message.

8. The apparatus as defined in claim 1, wherein the multimode mobile station sends said information about file encryption algorithms supported by the multimode mobile station in said further radio access network during connection setup, said radio access network configured to save said information about the encryption algorithms and to use said information about encryption algorithms in composing the integrity protected command message.

9. The apparatus as defined in claim 1, wherein the radio access network is configured to send information about the encryption algorithms supported by the multimode mobile station in said further radio access network to a core network.

10. The apparatus as defined in claim 1, wherein the radio access network is configured to receive a command message from a core network instructing the mobile station to cipher farther communications.

11. The apparatus as defined in claim 10, wherein the radio access network is configured to send to said multimode mobile station said protected command message after receiving said command message from the core network.

12. The apparatus as defined in claim 1, wherein said integrity protected command message instructs the multimode mobile station to cipher further communications.

13. An apparatus comprising:
a sender, of a multimode mobile station, configured to send to a first radio access network an unprotected signaling message including information about encryption algorithms supported by the multimode mobile station in a second radio access network,
a receiver configured to receive from the first radio access network an integrity protected command message including information relating to said encryption algorithms supported by the multimode mobile station in the second radio access network, said integrity protected command message comprising a payload and a message authentication code, and
wherein said mobile station is configured to conclude whether said information relating to said encryption algorithms in said integrity protected command message corresponds to said information about said encryption algorithms in said unprotected signaling message.

14. The apparatus as defined in claim 13, wherein said payload comprises information about encryption algorithms, said multimode mobile station configured to compare information about the encryption algorithms received in said payload with stored information about said encryption algorithms supported by the multimode mobile station.

15. The apparatus as defined in claim 13, wherein the multimode mobile station is configured to save the unprotected signaling message and to use the unprotected signaling message in an algorithm computing an expected message authentication code for the integrity protected command message.

16. The apparatus as defined in claim 13, wherein the multimode mobile station is configured to save a payload of the unprotected signaling message and to use the payload of the unprotected signaling message in an algorithm computing an expected message authentication code for the integrity protected command message.

17. The apparatus as defined in claim 13, wherein the multimode mobile station is configured to use information about the encryption algorithms supported by the multimode mobile station in said second radio access network together with information about an encryption algorithm for use with said first radio access network in computing an expected message authentication code for the integrity protected command message.

18. The apparatus as defined in claim 13, wherein said integrity protected command message omits information about the encryption algorithms supported by the multimode mobile station in said second radio access network and information about the security capability of said multimode mobile station in said first radio access network.

19. The apparatus as defined in claim 13, wherein said integrity protected command message comprises information about the encryption algorithms supported by the multimode mobile station in said second radio access network.

20. The apparatus as defined in claim 13, wherein the multimode mobile station is configured to send said information about the encryption algorithms supported by the multimode mobile station in said second radio access network during connection setup.

21. The apparatus as defined in claim 13, wherein said integrity protected command message instructs the multimode mobile station to cipher further communications.

22. A system, comprising:
a radio access network comprising a receiver configured to receive via a radio interface an unprotected signaling message including information about encryption algorithms supported by a multimode mobile station in a further radio access network, the further radio access network being different from the radio access network,
the radio access network being configured to compose an integrity protected command message including information relating to the encrypting algorithms supported by the multimode mobile station in said further radio access network, said integrity protected command message comprising a payload and a message authentication code, and
the radio access network also comprises a sender configured to send said integrity protected command message to said multimode mobile station; and a core network for receiving information about file encryption algorithms supported by the multimode mobile station in said further radio access network.

23. The system as defined claim 22, comprising a further radio access network.

24. The system as defined claim 22, comprising at least one multimode mobile station, configured to:
send to said radio access network an unprotected signaling message including information about encryption algorithms supported by the multimode mobile station in said further radio access network;
receive from the radio access network an integrity protected command message including information relating to said encryption algorithms supported by the multimode mobile station in the further radio access network, said integrity protected command message comprising a payload and a message authentication code; and
conclude whether said information relating to said encryption algorithms in said integrity protected command message corresponds to said information about said encryption algorithms in said unprotected signaling message.

25. A method comprising:
receiving from a multimode mobile station via a radio interface of a first radio access network an unprotected signaling message including information about encryption algorithms supported by the multimode mobile station in a second radio access network;
composing an integrity protected command message including information relating to the encrypting algorithms supported by the multimode mobile station in said second radio access network, said integrity protected command message including a payload and a message authentication code; and
sending said integrity protected command message to said multimode mobile station.

26. A method as defined in claim 25, comprising sending information about the encryption algorithms supported by the multimode mobile station in said second radio access network to a core network.

27. A method as defined in claim 25, comprising receiving a command message from the core network, said command message instructing the multimode mobile station to cipher further communication.

28. The method as defined in claim 27, further comprising sending to said multimode mobile station said protected command message after receiving said command message from the core network.

29. A method as defined in claim 25, comprising instructing the multimode mobile station to cipher further communications with said integrity protected command message.

30. The method in claim 25, further comprising attaching information about the encryption algorithms supported by the multimode mobile station in said second radio access network received in said unprotected signaling message to said payload, and applying said payload in an algorithm computing said message authentication code.

31. The method as defined in claim 25, further comprising saving the unprotected signaling message, and using the unprotected signaling message in an algorithm computing said message authentication code.

32. The method as defined in claim 25, further comprising saving a payload of the unprotected signaling message, and using the payload of the unprotected signaling message in an algorithm computing said message authentication code.

33. The method as defined in claim 25, further comprising saving information about the encryption algorithms supported by the multimode mobile station in said second radio access network, and using information about the encryption algorithms supported by the multimode mobile station in said second radio access network together with information about encryption algorithm embedded in a command message received from a core network in computing said message authentication code.

34. The method as defined in claim 25, further comprising omitting information about the encryption algorithms supported by the multimode mobile station in said second radio access network and information about the security capability of said multimode mobile station in said first radio access network in the integrity protected command message.

35. The method as defined in claim 25, further comprising including information about the encryption algorithms supported by the multimode mobile station in said second radio access network in the integrity protected command message.

36. The method as defined in claim 25, further comprising receiving said information about the encryption algorithms supported by the multimode mobile station in said second radio access network during connection setup, saving said information about the encryption algorithms at said first radio access network, and using said information about encryption algorithms in composing the integrity protected command message.

37. An apparatus comprising:
receiving means for receiving via a radio interface an unprotected signaling message including information about encryption algorithms supported by a multimode mobile station in a further radio access network;
wherein a first radio access network is configured for composing an integrity protected command message including information relating to the encrypting algorithms supported by the multimode mobile station in said farther radio access network, said integrity protected command message comprising a payload and a message authentication code;
sending means for sending said integrity protected command message to said multimode mobile station; and
providing means for providing multimode mobile stations with access to at least one core network.

38. A method, comprising:
sending from a multimode mobile station to a first radio access network an unprotected signaling message including information about encryption algorithms supported by the multimode mobile station in a second radio access network;
receiving at the multimode mobile station from the first radio access network an integrity protected command message including information relating to the encrypting algorithms supported by the multimode mobile station in said second radio access network, said integrity protected command message comprising a payload and a message authentication code; and
concluding whether the information relating to the encryption algorithms in the integrity protected command message corresponds to the information about the encryption algorithms in the unprotected signaling message.

39. The method as defined in claim 38, wherein said payload comprises information about encryption algorithms, and further comprising comparing at said multimode mobile station information about the encryption algorithms received in said payload with stored information about said encryption algorithms supported by file multimode mobile station.

40. The method as defined in claim 38, further comprising saving the unprotected signaling message at said multimode mobile station, and using the unprotected signaling message in an algorithm computing an expected message authentication code for the integrity protected command message.

41. The method as defined in claim 38, further comprising saving at the multimode mobile station a payload of the unprotected signaling message, and using the payload of the unprotected signaling message in an algorithm computing an expected message authentication code for the integrity protected command message.

42. The method as defined in claim 38, farther comprising using information about the encryption algorithms supported by the multimode mobile station in said second radio access network together with information about an encryption algorithm for use with said first radio access network in computing an expected message authentication code for the integrity protected command message.

43. The method as defined in claim 38, wherein said integrity protected command message omits information about the encryption algorithms supported by the multimode mobile station in said second radio access network and information about the security capability of said multimode mobile station in said first radio access network.

44. The method as defined in claim 38, wherein said integrity protected command message comprises information about the encryption algorithms supported by the multimode mobile station in said second radio access network.

45. The method as defined in claim 38, further comprising sending from the multimode mobile station said information about the encryption algorithms supported by the multimode mobile station in said second radio access network during connection setup.

46. The method as defined in claim 38, wherein said integrity protected command message instructs the multimode mobile station to cipher further communications.

47. An apparatus, comprising:
sending means for sending from a multimode mobile station to a first radio access network an unprotected signaling message including information about encryption algorithms supported by the multimode mobile station in a second radio access network;
receiving means for receiving at the multimode mobile station from the first radio access network an integrity protected command message including information relating to the encrypting algorithms supported by the multimode mobile station in said second radio access network, said integrity protected command message comprising a payload and a message authentication code; and
wherein said mobile station is configured to conclude whether the information relating to the encryption algorithms in the integrity protected command message corresponds to the information about the encryption algorithms in the unprotected signaling message.

* * * * *